(12) United States Patent
Williams et al.

(10) Patent No.: US 9,722,711 B2
(45) Date of Patent: Aug. 1, 2017

(54) NOISE MANAGEMENT FOR COMMUNICATION SYSTEM

(75) Inventors: Thomas H. Williams, Longmont, CO (US); Luis Alberto Campos, Superior, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 1136 days.

(21) Appl. No.: 13/372,906

(22) Filed: Feb. 14, 2012

(65) Prior Publication Data

US 2013/0208632 A1    Aug. 15, 2013

(51) Int. Cl.
*H04N 7/173* (2011.01)
*H04B 15/00* (2006.01)
*H04L 5/14* (2006.01)

(52) U.S. Cl.
CPC .............. *H04B 15/00* (2013.01); *H04L 5/14* (2013.01)

(58) Field of Classification Search
CPC ..................................................... H04B 10/04
See application file for complete search history.

(56) References Cited

U.S. PATENT DOCUMENTS

| | | | |
|---|---|---|---|
| 4,645,874 A * | 2/1987 | Fildes | 379/93.01 |
| 5,745,836 A * | 4/1998 | Williams | H04L 12/2801 348/E7.07 |
| 6,160,990 A * | 12/2000 | Kobayashi et al. | 725/135 |
| 6,348,837 B1 * | 2/2002 | Ibelings | H03F 3/68 330/126 |
| 6,493,335 B1 * | 12/2002 | Darcie et al. | 370/344 |
| 8,027,473 B2 * | 9/2011 | Stiscia et al. | 380/256 |
| 2004/0038644 A1 * | 2/2004 | Jimenez et al. | 455/13.3 |
| 2004/0213578 A1 * | 10/2004 | Takahara et al. | 398/147 |
| 2008/0056167 A1 * | 3/2008 | Kim | H04B 10/25759 370/294 |
| 2009/0196606 A1 * | 8/2009 | Miyagi et al. | 398/45 |
| 2009/0232111 A1 * | 9/2009 | Li et al. | 370/337 |
| 2010/0223651 A1 * | 9/2010 | Wang | H04L 12/2801 725/125 |
| 2010/0244943 A1 * | 9/2010 | Hahn et al. | 327/553 |
| 2012/0014696 A1 * | 1/2012 | Sniezko | 398/79 |
| 2012/0331501 A1 * | 12/2012 | Shafer | H03H 7/1766 725/27 |
| 2013/0125182 A1 * | 5/2013 | Bowler et al. | 725/105 |

* cited by examiner

*Primary Examiner* — John Blanton
(74) *Attorney, Agent, or Firm* — Great Lakes Intellectual Property, PLLC.

(57) ABSTRACT

A duplex communication system having gate-implemented noise management is contemplated. The system may include a gate or other device sufficiently operable to facilitate managing upstream and downstream signaling so as to ameliorate noise funneling between communicating endpoints by selectively controlling communication paths through which noise may be propagated. Optionally, the system may be operably configured to facilitate this type of gate-implemented noise management for time domain duplex (TDD) and frequency domain duplex (FDD) communications.

9 Claims, 3 Drawing Sheets

NOISE MANAGEMENT FOR COMMUNICATION SYSTEM

TECHNICAL FIELD

The present invention relates to duplex communication systems of the type wherein signaling travels in an upstream direction and a downstream direction, and particularly, to managing and/or reducing noise propagation in one or both of the upstream and downstream directions.

BACKGROUND

With the increasing demands on data communication systems, particularly cable, optical, wireless and/or other systems where a portion of the corresponding signaling is carried over long distances through a wireline medium (e.g., copper or fiber), it may be beneficial for those operators and service providers to upgrade the capacity of their systems to over 1 Gb/sec. To keep upgrade costs down, operators are interested in having a node or endpoint size of up-to 500 homes passed. An analysis of this high-frequency spectrum has shown that a conventional tree-and-branch architecture may experience random noise funneling, particularly when there is attenuation within the associated bandwidth. This attenuation can causes a received upstream signal to have a low signal-to-noise ratio, and if, a sufficient number of these noisy signals are combined, the uncorrelated random noise may grow as $10*\log(N)$, where N is the number of noisy lines combined. One solution to this problem is to limit node size, such as to 64 homes or fewer, in order to ameliorate the number of noisy signals being combined. The solution, however, may be disadvantageous since it may result in high upgrade costs.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
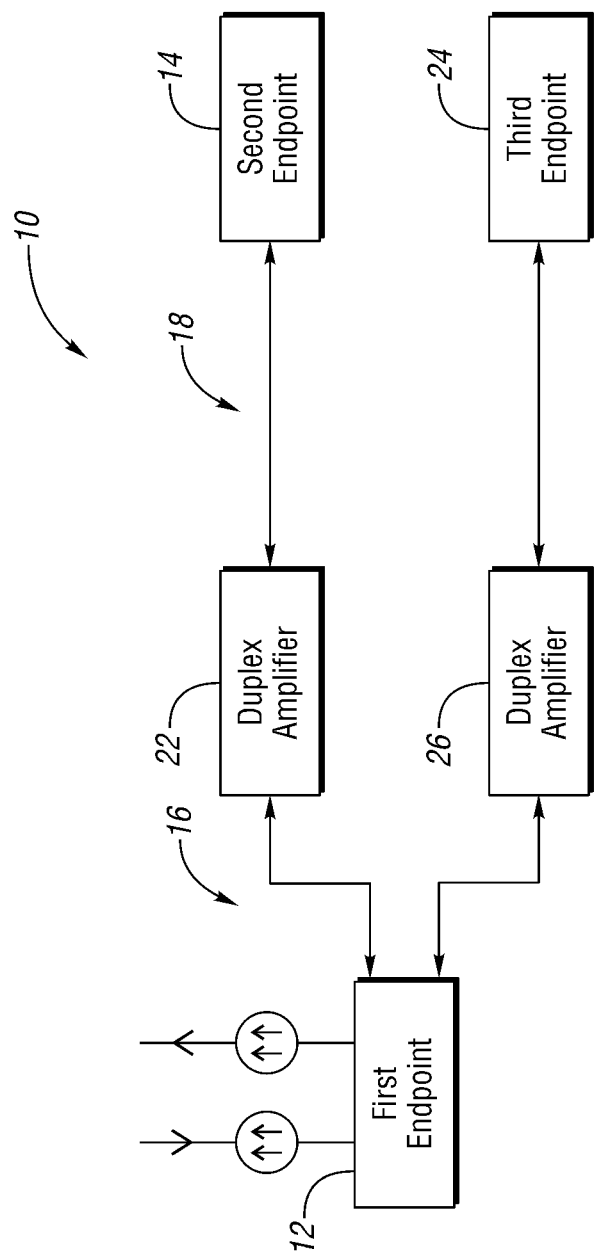
FIG. 1 illustrates a communication system as contemplated by one non-limiting aspect of the present invention.

FIG. 1 illustrates a communication system 10 as contemplated by one non-limiting aspect of the present invention. The communication system 10 may relate to any communication environment where signals are communicated or desired to be communicated between at least a first endpoint 12 and a second endpoint 14 over one or more networks 16, 18. The communication system 10 is predominately described with respect to the networks 16, 18 being comprised at least in part of copper or optical-fiber mediums through which signaling must be carried in order to facilitate communications between the first endpoint 12 and the second endpoint 14. This is done, however, for exemplary non-limiting purposes as the present invention fully contemplates its use and application in other systems, and particularly wireless or cellular systems configured such that at least a portion of the signaling is carried through wired or wireline communications.

The communications contemplated by the present invention may relate to virtually any type of electronic communication where analog and/or digital signaling is required. The present invention is predominately described with respect to facilitating communications associated with multiple system operators (MSOs) of the type that provide a plurality of services to a plurality of customers/subscribers, however, the present invention fully contemplates its use with any type of service provider. The services may include high-speed Internet service, television services, telephony services, etc. The system 10 may be configured to facilitate communications in the noise-limiting manner contemplated by the present invention between virtually any type of endpoint. For exemplary, non-limiting purposes, the first endpoint 12 is described with respect to being a fiber node or other interface configured to facilitate optical signal exchange with another network and the second endpoint 14 is described with respect to being a device having capabilities sufficient to facilitate communications with the first endpoint 12.

The system 10 is shown to include an amplifier 22 to facilitate the communications between the first and second endpoints 12, 14. The amplifier 22, as described below in more detail, may be configured to facilitate amplifying while also regulating or otherwise managing/controlling upstream and downstream communications between the first and second endpoints 12, 14 in a manner that ameliorates noise funneling and/or noise propagation. The amplifier 22 is described as amplifying signaling as it is believed that the signaling between the first and second endpoint 12, 14 will require amplification in order to ensure proper data transmissions. The present invention, however, fully contemplates use of the amplifier 22 without amplifying the signals communicated therethrough, such as to facilitate managing noise funneling without amplifying signals communicated in one or both of an upstream and downstream direction, e.g., to provide return isolation. The amplification of the amplifier 22 may be particularly beneficial in environments where signaling is traveling a relatively long distance between endpoints.

A third endpoint 24 is shown to be similarly connected to the first endpoint by way of another duplex amplifier 26. This third endpoint 24 is shown to represent a scenario where the first endpoint 12 is tasked with facilitate communications between a plurality of endpoints 14, 24. The second, third, or any number of other endpoints 14, 24 may be associated with a node or other device associated with supporting communications with a plurality of devices, such as a string of taps (not shown). The endpoints 12, 14, 24 and/or the devices connected thereto may be a mobile device, a mobile phone, a tablet PC, a laptop, set-top box (STB), a gateway device, a media terminal adapter (MTA), a modem, a television having an integrated STB, or other device through which services may be accessed. These devices may be particularly suitable for use with a broadcast, satellite, or cable television service provider, a telecommunications operator, such as but not limited to a cellular or wireless telephone provider, and/or other provider of electronic services, such as but not limited to a video/content download or streaming service provider.

Figure 2:
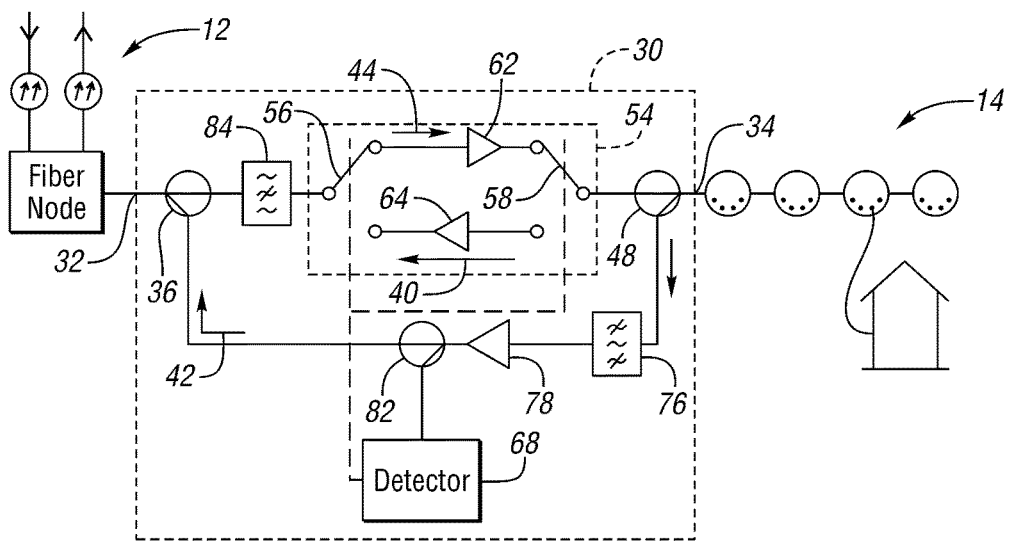
FIG. 2 illustrates an amplifier as contemplated by one non-limiting aspect of the present invention.

FIG. 2 illustrates an amplifier 30 as contemplated by one non-limiting aspect of the present invention. The amplifier 30 may be configured to facilitate downstream and upstream signaling where the downstream signaling corresponds with communications from the first endpoint 12 to the second endpoint 14 and the upstream signaling corresponds with communications from the second endpoint 14 to the first endpoint 12. The first endpoint 12 may correspond with the fiber node described above and the second endpoint 14 may correspond with a home or other device connected to one of a number of plurality of taps associated with a string of taps made available to subscribers within a corresponding geographical area. The amplifier 30 may include a first interface 32 to facilitate signal exchange with the first endpoint 12 and a second interface 34 to facilitate signal exchange with the string of taps 14, i.e. the second endpoint 14 or other device connected to the string of taps. For descriptive purposes, the string of taps and the second endpoint may be collectively referred to as the second endpoint 14.

The first and second interfaces 32, 34 may correspond with any interface sufficient to facilitate the signal exchange contemplated by the present invention. One type of interface may be a coaxial cable. The interfaces 32, 34 may be operably configured to facilitate electrical and/or optical transmission. The first interface 32 may include a first coupler 36 or other suitably configured element to facilitate combining upstream signaling from first and second upstream signaling paths 40, 42. The first coupler 36 may also be configured to pass-through downstream signaling through a first downstream signaling path 44. (While a coupler is noted, the coupler may be directional coupler (optionally with different power levels at each path), combiner, coupler (optionally with same power levels at each path), etc.) The second interface 34 may include a second coupler 48 or other suitably configured element to facilitate copying upstream signaling into the first and second upstream signaling paths 40, 42. The second interface 34 may also be configured to pass-through downstream signaling from the downstream signaling path 44. In this manner, the amplifier 30 may be configured to facilitate upstream and downstream signaling between the first endpoint 12 and the second endpoint 14.

One non-limiting aspect of the present invention contemplates facilitating the upstream and downstream signaling in a manner that ameliorates and/or controls noise funneling and propagation with corresponding control of a gate 54. The gate 54 may be operably configured to facilitate switching available communication paths through the amplifier 30 between one of the upstream signaling path 40 and the downstream signaling path 44. This may be done by controlling a first connector 56 and a second connector 58 of the gate 54 such that the first and second connectors 56, 58 connect to a first amplifier 62 when downstream signaling is desired and the first and second connector connects 56, 58 to a second amplifier 64 when upstream signaling is desired. The gate 54, or more particularly the first and second connectors 56, 58, may be controlled between the first and second amplifiers 62, 64 according to instructional signals received from a detector 68. Optionally, the first and second connectors 56, 58 may be biased to the first amplifier 62 in the absence of the corresponding signaling from the detector 68 so as to ensure continued downstream communications in the absence of contrary signals from the detector 68.

The first and second amplifiers 62, 64 may be any amplifier suitably configured to facilitate amplifying signals passing therethrough. The first and/or second amplifier 62, 64 may be required in order to ensure proper transmission of the corresponding signaling between the first and second endpoints 12, 14. The amplifiers 62, 64 may be configured to amplify the signaling passing therethrough. The amplifiers provide both gain and reverse isolation which allows signals to flow in one direction only. The present invention, however, fully contemplates its use and application in other communication environments where the amplification achieved by the first and/or second amplifiers 62, 64 may be unnecessary such that one or both of these amplifiers 62, 64 may be removed from the amplifier 30. The ability of the present invention to selectively open one of the downstream and/or upstream signaling paths 44, 40 with corresponding control of the first and second connectors 56, 58 may be beneficial in ameliorating or otherwise managing noise funneling.

The noise funneling, for example with respect to upstream signaling, may be managed by controlling the first and second connectors 56, 58 to be connected with the first amplifier 62 such that upstream signaling through the amplifier 30 is prevented. This positioning of the gate 54 produces an open circuit between the first and second interfaces 32, 34 in the upstream direction such that noise and other signaling introduced by one of the devices connected to the string of taps in the upstream direction is prevented from propagating beyond the amplifier 30, i.e., to the first endpoint 12 and/or other devices (e.g., other amplifiers) sharing an input with the first endpoint 12. While the gate 54 is shown to include the first and second connectors 56, 58 to facilitate the contemplated control of noise funneling, the present invention fully contemplates the gate 54 being configured in a different manner and/or without use of the first and second connectors 56, 58 in order to facilitate the control contemplated by the present invention.

The amplifier 30 shown in FIG. 2 may be particularly beneficial in facilitating time domain duplex (TDD) managed signaling where a controller (not shown) is tasked with identifying and/or assigning a timeslot or other interval during which devices connected to the system are entitled to communicate upstream and downstream signaling. The controller may be configured so as to ensure that one of the upstream and/or downstream signaling paths are available to each device desiring communication between the endpoints 12, 14. The controller, optionally, may also be configured to facilitate control of the gate 54 in that it may be configured to facilitate controlling the first and second connectors 56, 58 between the first and second amplifiers 62, 64. While this control is contemplated, it is believed that the detector 68 may be more advantageous as use of the controller may require a complex management arrangement since the devices desiring upstream and/or downstream may need to request a timeslot for communications from the controller, in addition to the controller having to coordinate related control of the gate 54, in order to ensure the proper upstream or downstream signaling pathways available at the appropriate period of time.

The detector 68 may be better suited to facilitate controlling the gate 54, i.e., identifying the appropriate period time during which the gate 54 should be controlled between the first and second signal paths 40, 44 (i.e., the connectors 56, 58 between the first and second amplifiers 62, 64). The detector 68 may do this based on a gate-control signal included within the upstream and/or downstream signaling. With respect to the upstream signaling, when one of the devices connected to the string of taps desires to communicate upstream signaling, the device may embed or otherwise add a gate-control signal to the desired upstream signaling in order to prompt the detector to implement the corresponding control of the gate (e.g., in the event the first and second connectors 56, 58 are connected to the first amplifier 62, the gate-control signal may prompt the detector 68 to actuate the first and second connectors 56, 58 to be connected with the second amplifier 64 in order to provide the desired upstream signaling path).

Figure 3:
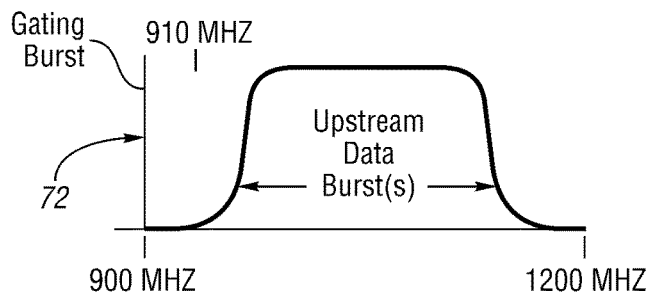
FIG. 3 illustrates a gate-control signal as contemplated by one non-limiting aspect of the present invention.

FIG. 3 illustrates a gate-control signal 72 as contemplated by one non-limiting aspect of the present invention. The gate-control signal 72 may be a data burst included within upstream signaling to notify the detector 68 when to control the gate 54 to facilitate upstream signaling. The illustrated gate-control signal 72 is shown within the frequency domain to correspond with a data burst having a width of approximately 290 MHz. This gate-control signal 72, however, is shown for exemplary purposes as the present invention fully contemplates the use of other gate-control signals. While the gate-control signal 72 is described with respect to being added to signaling by the originating device, i.e., the second endpoint 14, the present invention also fully contemplates the controller or other element associated with the system 10 adding the gate-control signal to the upstream and/or downstream signaling. The gate-control signal 72 may be a tone, a continuous wave, a modulated signal, or other suitable signal.

The illustrated gate-control signal 72 is shown to occupy a frequency range of between 900 MHz and 1200 MHz as one non-limiting aspect of the present invention contemplates use of the amplifier in an environment where upstream and/or downstream signaling may take place within the 900-1200 MHz bandwidth, which may be particular prevalent and relevant to a cable television networks and/or other high-speed data networks where desired communication speeds and/or bit rates may necessitate the use of such a relatively high frequency bandwidth. The present invention particular contemplates facilitating the communications at this frequency as it is believed that the amplifier may be used to facilitate communications with 500 or more homes without experience an unworkable or undesirable level of noise funneling, i.e., the amplifier may be sufficient to allow the present invention to facilitate high-speed data transmission to 500 or more homes while maintaining suitable signal-to-noise ratios and/or other communication requirements necessary to facilitate sufficient communication standards.

While the data burst 72 is shown to occupy the bandwidth of approximately 910-1200 MHz, the related signaling actually passing through the upstream and/or downstream paths may be within the 900-1200 MHz range and or virtually any other signaling range as the first and second amplifiers 62, 64 and/or the other components comprising the amplifier 30 are not necessarily limited to supporting signaling within the 900-1200 MHz range. In this manner, the present invention contemplates an arrangement where a relatively narrow frequency range may be processed in order to identify the gate-control signal 72 so that an entire available range of frequency need not be scanned and/or processed in order to detect the gate-control signal 72. The frequency of the gate-control signal 72 may be fixed and/or periodically varied during operation, such as in response to a system change and/or instructions from one of the endpoints 12, 14 specifying a desired frequency band. The gate-control signal 72 also need not correspond with the configuration in shape shown within FIG. 3 as the present invention fully contemplates the gate-control signal having other configurations and/or shapes.

A first bandpass filter 76 may be included within the amplifier 30 to facilitate filtering the second copy 42 of the upstream signaling in order to remove the non-gate-control signaling from signaling used by the detector 68. (Optionally, the bandpass filter may be tunable or otherwise selectively controlled to filter out a desired portion of the upstream signaling associated with the gate-control signal.) The use of the bandpass filter may provide a hardware solution to ameliorate the processing demands on the detector 68. A third amplifier 78 may be included downstream of the bandpass filter 76 in order to amplify the gate-control signal 72. The amplification of the gate-control signal 72 may be necessary to maintain the power ratio of the upstream data burst to the gate-control signal. Positioning the amplifier 78 after the bandpass filter 76 may be beneficial in reducing the power of the amplifier 78 as opposed to including an amplifier 78 prior to the bandpass filter 76 where it would be required to amplify that entire upstream signal as opposed to a lesser portion of the signal comprising the gate-control signal 72.

A third coupler 82 may be included to facilitate copying the amplified gate-control signal 72 or other signal passing through the bandpass filter 76 to the detector 68 and the first interface 32. The detector 68 may rely upon the split signal when identifying the gate-control signal 72 and implementing corresponding control of the gate 54. The first coupler 36 may combine the gate-control signal 72 output from the third coupler 82 with other upstream signaling in order to facilitate further upstream propagation of the gate-control signal 72. This propagation of the gate-control signal 72 may be beneficial in the event another, similarly configured amplifier is positioned further upstream and requires receipt of the gate-control signal 72 in order to ensure availability of a suitable upstream signaling path. For example, additional upstream amplifiers may be included in a daisy-chained or cascaded architecture so that more than 500 homes can be connected to the same fiber node without undesirable sacrificing signal-to-noise ratios, e.g., the subsequent amplifier may be used to combine signaling from multiple downstream, amplifiers and to permit longer cable reaches.

The amplifier 30 may include a band-stop filter 84 to filter upstream and/or downstream signaling for the gate-control signal 72. This may include the band-stop filter removing signaling from the upstream and/or downstream signaling paths that matches with the frequency range and/or bandwidth of the gate-control signal 72. The use of the band-stop filter 84 may be beneficial in ameliorating propagation of the gate-control signal 72 in the upstream and/or downstream directions. This may be beneficial in further limiting and managing noise propagation in the signaling as use of the gate-control signal 72 may be undesirable beyond one or more of the amplifiers such that the gate control signal 72 would be considered as noise to additional devices within the signal pathway. Additionally, the band-stop filter 84 may be beneficial in ameliorating and/or preventing oscillation with feedback around a loop and/or the potential of two paths resulting in gate control signal canceling itself.

Figure 4:
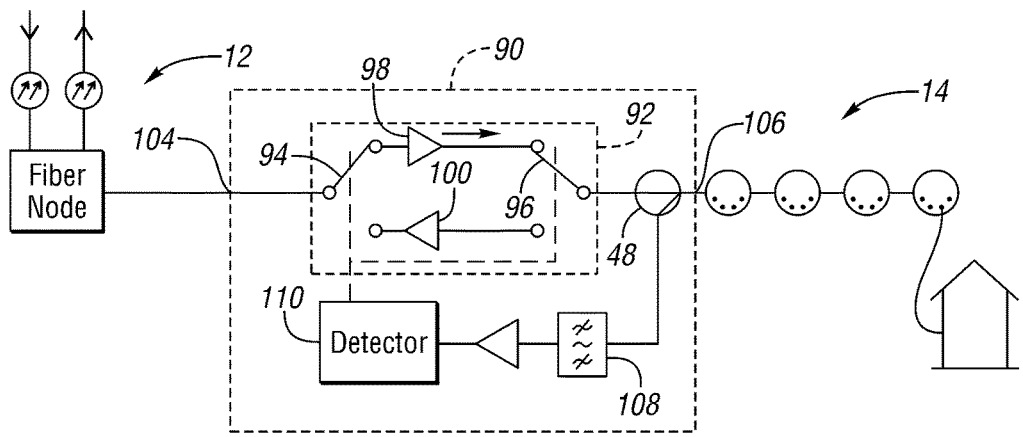
FIG. 4 illustrates a duplexed amplifier as contemplated by one non-limiting aspect of the present invention.

FIG. 4 illustrates an amplifier 90 as contemplated by one non-limiting aspect of the present invention. The amplifier 90 may include a gate 92 configured similarly to the gate 54 shown in FIG. 2 in that the gate 92 may be configured with first and second connectors 94, 96 operable between first and second amplifiers 98, 100 to facilitate creating one of an amplified upstream and downstream signal path between corresponding first and second interfaces 104, 106. The amplifier 90 may be a less robust or less sophisticated configuration compared to the duplexed configuration shown in FIG. 2 in that the gate-control signal 72 filtered with a bandpass filter 108 is not communicated beyond a detector 110 configured to control the gate.

Figure 5:
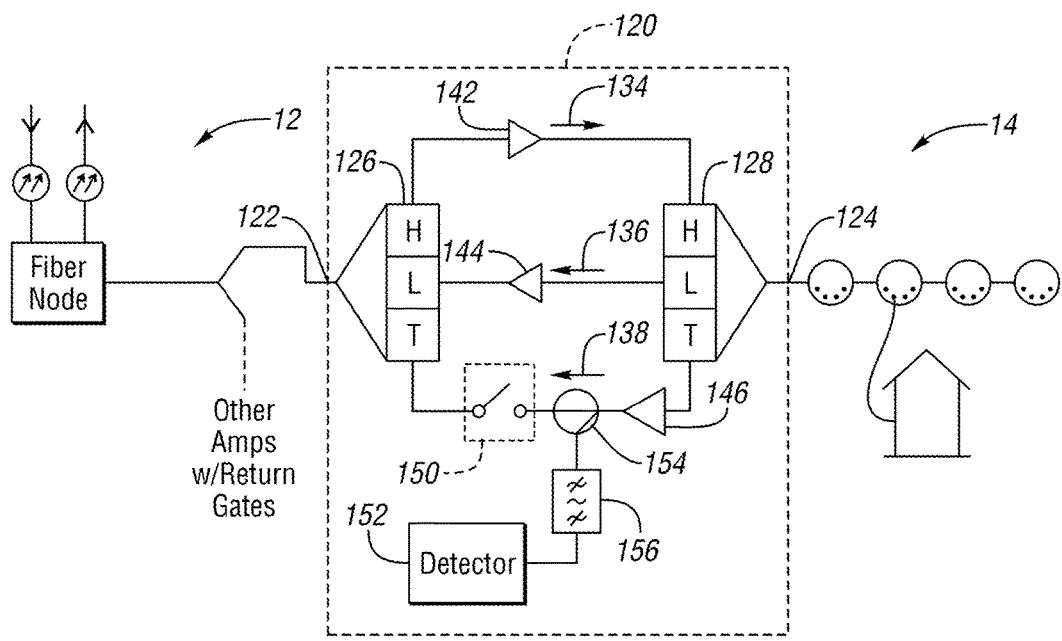
FIG. 5 illustrates an amplifier as contemplated by one non-limiting aspect of the present invention.

FIG. 5 illustrates an amplifier 120 as contemplated by one non-limiting aspect of the present invention. The amplifier 120 is shown to be configured similarly to the amplifiers 30, 90 described above with respect to amplifying communications between a first endpoint 12 and a second endpoint 14. The amplifier 120 may include a first interface 122 configured to facilitate changing signaling with the first endpoint 12 and a second interface 124 configured to facilitate exchange signaling with the second endpoint 14 (the second endpoint 14 may be one of a string of taps and/or a specific device, both of which are used interchangeably).

The amplifier 120 is shown to include a first multilevel divider 126 and a second multilevel divider 128. The multilevel dividers 126, 128 may be coupler filters or other suitably configured devices sufficiently configured to facilitate high-split, low-split, and top-split operations of the type where certain signals are transferred along a corresponding a high-signal path 134, a low-signal path 136, and a top-split signal path 138. The multiple signal paths 134, 136, 138 may correspond with a use environment where the high-signal path 134 is used to facilitate signaling between 54-860 MHz, the low-signal path 136 is used to facilitate signaling between 5-42 MHz, and the top-split signal 138 path is used to facilitate signaling between 900-1200 MHz, which may be particularly suitable with cable television and high-speed data systems relying on coaxial cable and/or optical communication mediums.

The amplifier 120 may include a first amplifier 142, a second amplifier 144, and a third amplifier 146 to facilitate amplifying signals communicated over the corresponding high-signal path 134, low-signal path 136, and top-signal path 138. The high-signal path 134 may correspond with the only downstream signal path whereas the low-signal path 136 and the top-signal path 138 may correspond with dual upstream signal paths. The low-signal path 136 may be used for older technologies and/or with legacy type devices that may not have the capabilities to support upstream communications with in the 900-1200 MHz frequency range. The top-signal path 138 may be used with newer technologies and/or devices having capabilities sufficient support vacations within a 900-1200 MHz frequency range, which may be desirable in accordance with the present invention to facilitate increased communication speeds and bit rates. The present invention describes the amplifier 120 including the low-split signal path 136 in order to facilitate operations with legacy devices; however, the present invention fully contemplates the amplifier eliminating the low-signal path 136 by removal of amplifier 144.

The amplifier 120 may include a gate 150 configured to open and close the top-split signal path 138 depending on corresponding instructional signals received from a detector 152. Optionally, the gate 150 may be normally biased to the closed position such that receipt of a signal or energy from the detector 152 may be required to actuate this gate 150 to the closed position, i.e., the gate 150 may automatically actuate to the closed position in the absence of a sufficient electrical signal from the detector 152, which may be beneficial in the event the detector 152 should fail or otherwise be unable to properly control the gate 150 as the service provider may desire upstream communications with the subscribers even in the event disruption. A coupler 154 may be included to facilitate copying the top-split signaling path 138 to the detector 152 for use in identifying the gate-control signal 72. Optionally, a bandpass filter 156 may be included between the coupler 154 and the detector 152 to filter signaling associated with the gate-control signal 72.

The third amplifier 146 is shown to be included before the bandpass filter 156 in order to ensure the top-split signals are properly amplified for further communication upstream beyond the amplifier 120. This may result in the amplifier 146 having to be configured to support a wider amplification bandwidth than the bandpass filter 76 shown in FIG. 2 since it will be required to amplify all signaling carried within the top-split signal path 138, unlike the bandpass filter 76 shown in FIG. 2 which is only required to amplify the narrower bandwidth associated with the gate-control signal 72. This, however, can be beneficial in limiting use of an additional amplifier to amplify the top-split signaling for further upstream communications. The first, second, and third amplifiers 142, 144, 146 may be configured in a manner similar to the amplifiers described above. The first, second, third amplifiers 142, 144, 146, like the amplifiers described above, need not necessary perform the same amount of amplification.

The amplifier 120 may be particularly beneficial for use within a frequency domain duplex (FDD) environment where the timing of upstream and downstream signaling between endpoints 12, 14 is dictated by a scheduler In contrast to the TDD configuration of the amplifier described above in FIGS. 2 and 4, the FDD amplifier 120 is configured to support continuous downstream signaling over the high-split signal path 134 and the low-split signal path 136 regardless of positioning of the gate 150, i.e., signaling is supported when the gate 150 is in the open position. This capability particularly enables the amplifier 120 to facilitate FDD amplifier. The present invention fully contemplates the amplifiers 30, 90 described above in FIGS. 2 and 4 also supporting the signaling ranges associated with the amplifier 120 of FIG. 5, i.e., the range of frequencies associate with the high-split signal path 134, the low-split signal path 136, in the top-split signal path 138. For example, upstream frequencies could be either higher or lower than downstream frequencies.

Figure 6:
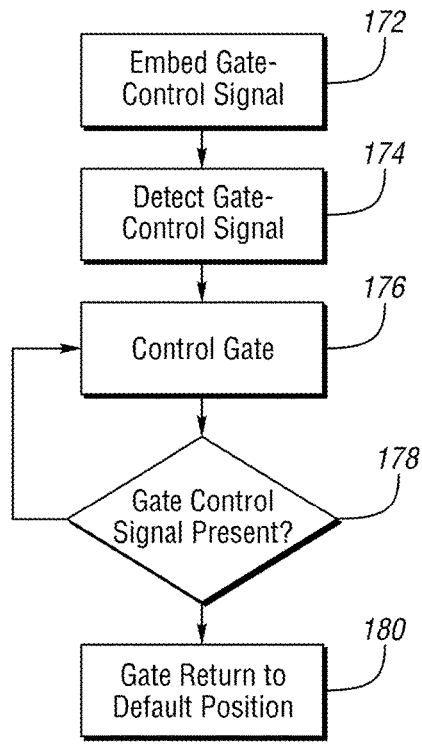
FIG. 6 illustrates a flowchart of a method for managing noise funneling as contemplated by one non-limiting aspect of the present invention.

FIG. 6 illustrates a flowchart 170 of a method for managing noise funneling within a communication system configured to facilitate communications between at least a first endpoint and a second endpoint as contemplated by one non-limiting aspect of the present invention. The communication system may correspond with one or more of the communication systems described above or another communication system where gate or switch-implemented control may be suitable for use with amplified and/or non-amplified signaling. The method may be embodied in a computer-readable medium or other logical functioning element operable with a processor or other feature of one or more of the devices for facilitate managing noise funneling in the described manner. The method is described for exemplary and non-limiting purposes with respect to managing noise funneling with respect to one of the above described amplifiers.

Block 172 relates to a gate-control signal being embedded within signaling intended to be carried through an amplifier. The gate-control signal may take the form of the gate-control signal described above or another signal suitable to instigate the gate control contemplated by the present invention. The gate-control signal may be embedded or otherwise added to the signaling by an endpoint, a device connected to the endpoint, and/or a controller or other system-level element tasked with managing at least a portion of the system and/or network used to facilitate transmission of the signaling. The gate-control signal may be embedded with the signaling in the event the gate-control signal precedes the signaling, e.g., travels before the signal, and/or in the event the gate-control signal travels with the signaling, i.e., if it is include for with the signaling for all or at least a portion of the duration of the signaling. Optionally, the gate-control signal may be considered as being embedded even if it is separately transmitted from the signaling in the event it is otherwise embedded with a medium used to communicate with the amplifier. Optionally, a gate control signal may communicate when and for how long the gate should remain open.

Blocks 174, 176 relate to a detector, or other element associated with controlling a gate or other device within the amplifier to control path availability, detecting the gate-control signal and implementing a corresponding gate control action (or other suitable action for the switching/control element included within the amplifier). The implemented control may include the detector actuating the first and second connectors between two or more amplifiers associated with one or more upstream and downstream signaling paths (e.g., see FIGS. 2 and 4) and/or the detector actuating the gate between opened and closed positions to control availability of an upstream signaling path (e.g., see FIG. 5). The control implemented by the detector may be specified within the gate-control signal, such as with data embedded in a payload thereof, and/or pre-programmed into the detector, such as by the controlling being programmed to control the gate to a specified position whenever the gate-control signal is present (in which case the gate-control signal may not necessarily include embedded data) and/or to implement a certain type of gate control depending on a trigger event specified in the gate-control signal (e.g., an identifier may be included and mapped by the detector to a previously specified control strategy).

Block 178 relates to assessing whether the gate-control signal is present within the signaling, whether a need exists to continue control of the gate to support upstream/downstream communications, and/or whether the gate should otherwise continue to be controlled to its non-biased position (e.g., in the even the gate is configured to normally support downstream signaling, the non-biased position may corresponding with positioning required to support upstream signaling). Each of these conditions, and others, may be used to assess whether it is desirable to control the gate to block upstream/downstream communications, and thereby, noise funneling introduced to the systems as a function thereof. As noted above, the present invention contemplates ameliorating the effects of noise funneling by directionally disable signaling, from propagating through a communication system by inducing an open condition within the corresponding signaling path that is sufficient to prevent noise from passing through to other parts of the system.

Block 180 relates to assessing whether the gate should continue to be controlled in the current manner or returned to its default/unbiased position. The continued presence of the gate-control signal may be used to continue control of the gate to the current position in order to facilitate control of the gate solely from the signaling, i.e., without relying on independent signaling. This process is believed to be robust and sufficient to support cascade arrangements as the gate-control signal can continue to travel with the signaling. This process is also believed to be robust since the gate-control signal is added by the originating device when the originating device is instructed to transmit the signaling. Of course, the present invention is not so limited and fully contemplates other process for assessing the need to continue the implement gate control, such as by including timing information within the gate-control signal and/or otherwise transmitted to the detector to specify a period of time during which upstream signaling should be supported, e.g., a period of time sufficient to conduct the desired signaling.

As supported above, one non-limiting aspect of the present invention contemplates enabling cable operators and other system providers to increase the capacity of their systems to over 1 Gb/sec.

One non-limiting aspect of the present invention contemplates a return-gate device that blocks all upstream signals in the Top-split band, except for the transmission(s) that has been assigned a time slot for transmission. All other signals, along with their elevated noise floors and any ingress, can be blocked. This solution can work with either TDD (time domain duplex) or FDD (frequency domain duplex) systems. The return gates can be controlled by a gating RF burst from the home devices, which may be cable modems, multimedia terminal adaptors, gateways, or AMP (advanced mac and phy devices). Gating-bursts may be simply out-of-band CW carriers that start just before the data packet and cause the return-gate to close and open.

One non-limiting aspect of the present invention contemplates a forward 54-860 MHz signal passes through an amplifier in normal fashion and goes to all homes following the amplifier. Transmissions from the homes in the 860-1200 MHz band can include an accompanying trigger burst at some frequency, such as a fixed 900 MHz and data carrier(s) at other frequencies, such as 910-1200 MHz. The width of the bandpass filter preceding the detector can be used to insure a very short time between the trigger burst's reception and the closing of the electronic return gate. A return gate can insure funneling random noise from preamplifier or ingressing noise from a string of taps does not contaminate the spectrum while other transmissions are entering the upstream top-split system through other return gates. Advantageously, the gating burst detector can be located before the first upstream diplex filter, allowing the diplexer's crossover frequency (860-900 MHz) to be used for the return gate signal.

One non-limiting aspect of the present invention contemplates a TDD (time division duplex) system with a return gate where amplifiers amplify in the 900-1100 MHz band. (Note that both the 5-42 MHz sub-split signal path and the 54-860 MHz downstream path have been omitted for clarity in FIGS. 2 and 4.) A trigger burst signal causes the direction switch to flip to all an upstream transmission to pass. After the trigger burst signal ceases, the direction switch reverts to the downstream direction. A directional coupler can be used to sample the trigger burst, which can then be filtered and amplified. If a trigger burst is occurring, the detector switches the direction switch to the upstream direction. The trigger burst can be forwarded through directional coupler to trigger the next upstream amplifier in the cascade. A band-stop filter ahead of the forward amplifier can be used to prevent an oscillation loop. Forwarding the trigger burst can be done to prevent cascading delays on a cascade of multiple amplifiers.

The present invention contemplates achieving one or more or more of the following results: noise floor being greatly reduced/controlled, allowing higher order modulations, much higher upstream throughput and larger node size; ingress signals, such as MOCA (Multimedia over Coax Alliance) transmissions, cell phone signals, and burst noise, are also blocked along with the high random noise floor; if a home with ingress is discovered two things happen: you know which branch has an ingress problem, and it doesn't affect any other subscribers; higher order modulation can be accommodated for signals with low drop attenuation, and hence lower noise floors, which allows some terminal devices to take less time transmitting the content of their data buffer, increasing upstream capacity; return gates being added after the pre-amplifiers, which will be located in the first active amplifiers; amplifiers being upgraded for top-split operation anyway, so the cost penalty is minimal; the gain of the pre-amplifiers can be reduced (AGC) as an alternative to using return-gates; enabling all types of modulations, such a ATDMA, wavelets, SC-FDMA, and OFDMA; a return gate switch transmission can come in through a sub-split 5-42 MHz band, which is normally not blocked; if the transmissions were orthogonal frequency division multiplex (OFDM), pilot tones could be detected in the guard interval to close the gate; if several homes in a node have low noise floors, they can be allowed to transmit at the same time, and there will be minimal interference from noise funneling and if a home has a very high noise floor, it will need to transmit alone so that the entire band can be occupied; in a node plus zero amplifiers scenario (no amplifiers) the return-gate switches can still be used to reduce ingressing signals and assist troubleshooting such that the lines from the north, south, and east direction could be shut off while transmissions were coming in from the west; and when contention time slots occur (when all gates were closed), but implementing polling for bandwidth access.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A signaling system comprising:
   a first endpoint configured to interface upstream and downstream signaling with a network;
   a second endpoint configured to interface the upstream and downstream signaling with a plurality of devices, each of the plurality of devices communicating through the second endpoint when transmitting the upstream signaling and when receiving the downstream signaling, each device being configured to embed a gate-control signal within the upstream signaling when desiring upstream communications;
   a first noise management device configured to ameliorate noise funneling comprising:
   i) a first interface operable to exchange signals with the first endpoint;
   ii) a second interface operable to exchange signals with the second endpoint;
   iii) a first amplifier operable to amplify the downstream signaling while being communicated from the first interface to the second interface through a downstream signaling path;
   iv) a second amplifier operable to amplify the upstream signaling while being communicated from the second interface to the first interface through an upstream signaling path;
   v) a gate operably connected between the first interface and the second interface and controllable between at least a first position and a second position, the first position opening the upstream signaling path to disable the upstream signaling, the first position closing the downstream signal path to enable the downstream signaling, the second position closing the upstream signaling path to enable the upstream signaling, the second position opening the downstream signaling path to disable the downstream signaling; and
   vi) a detector configured to control the gate to the second position upon detecting the gate-control signal being embedded within the upstream signaling by any one of the plurality of devices;
   wherein the second endpoint is configured to include data within a payload of the gate-control signal;
   wherein the detector is configured to process the data prior to controlling the gate to the second position, including controlling the gate to the second position if the data matches with a previously assigned identifier and to prevent controlling the gate to the second position if the data fails to match with the previously assigned identifier;
   wherein the detector is configured to control the gate to the first position in the absence of detecting the gate-control signal being embedded within the upstream signaling by any one of the plurality of devices after expiration of an appropriate period of time following control of the gate to the second position while the second interface continues to receive the upstream signaling;
   wherein the gate includes a first connector and a second connector, wherein:
   i) the first connector operably connects the first interface to the first amplifier when the gate is in the first position;
   ii) the second connector operably connects the first amplifier to the second interface to enable downstream signaling when the gate is in the first position;
   iii) the first connector operably connects the first interface to the second amplifier when the gate is in the second position; and
   iv) the second connector operably connects the second amplifier to the second interface when the gate is in the second position
   wherein the first noise management device includes a first coupler operably connected to the second interface to copy the upstream signaling into a first signal and a second signal, the first coupler configured to transfer the first signal to the second connector and to transfer the second signal for use with the detector, the detector detecting for the gate-control signal based on the second signal;
   wherein the first noise management device includes a first bandpass filter operably connected between the first coupler and the detector, the first bandpass filter filtering the gate-control signal from the second signal to generate a third signal, the third signal excluding any portion of the upstream signaling falling outside a bandwidth allocated to the gate-control signal, the detector detecting for the gate-control signal based on the third signal; and wherein the first noise management device includes a third amplifier operably connected between the first bandpass filter and the detector, the third amplifier amplifying the third signal to create a fourth signal, the detector detecting for the gate-control signal based on the fourth signal;

wherein the first noise management device includes:

i) a second coupler operably connected between the third amplifier and the detector, the second coupler configured to copy the fourth signal into a fifth signal and a sixth signal, the detector processing the fifth signal to detect the gate-control signal;

ii) a second bandpass filter operably connected between the first connector and the first interface, the second bandpass filter filtering the gate-control signal from the first signal to generate a seventh signal, the seventh signal excluding any portion of the upstream signaling falling inside the bandwidth allocated to the gate-control signal; and iii) a third coupler operably interconnected between the second bandpass filter and the first interface, the third coupler configured for combining the sixth signal with the seventh signal to create an eighth signal, the eighth signal forming the upstream signaling interfaced with the first endpoint.

2. The system of claim 1 wherein the detector is configured to detect the gate-control signal within a 900-1200 MHz bandwidth.

3. The signaling system of claim 1 wherein the second endpoint includes a string of 500 taps operable to facilitate upstream signaling within a 900-1200 MHz frequency band, each device connecting to at least one of the taps when transmitting the upstream signaling within the 900-1200 MHz frequency band, each device being configured to embed the gate-control signaling within the 900-1200 MHz frequency band in order to control the gate to the second position.

4. The system of claim 1 further comprising a controller configured to allocate timeslots to the plurality of devices, the plurality of devices requiring at least one timeslot before being permitted to transmit the upstream signaling, the controller arbitrating between the plurality of devices to determine which one of the plurality devices is allocated a timeslot at any particular instance in time, the controller specifying the data to be included in the gate-control signal necessary for the detector to control the gate to the second position.

5. A noise management device configured to ameliorate noise funneling in a communication system having at least a first endpoint configured for interfacing signaling with a network and a second endpoint configured for interfacing signaling with a plurality of devices connected to a string of taps, the communication system facilitating downstream signaling from the first endpoint to the second endpoint and upstream signaling from the second endpoint to the first endpoint, the plurality of devices being configured to transmit the upstream signaling within a 900-1200 MHz frequency range, the noise management device comprising:

a first interface operable to exchange signals with the first endpoint;

a second interface operable to exchange signals with the second endpoint;

a gate operably connected between the first interface and the second interface to control passage of the upstream and downstream signaling therebetween, the gate being operable to a first position to permit the downstream signaling and to a second position to permit the upstream signaling, the gate being unable to simultaneously permit both of the upstream and downstream signaling;

a detector configured to control the gate to the second position upon detecting a gate-control signal being embedded within the upstream signaling by at least one of the plurality of devices;

a first coupler operably connected between the gate and to the second interface to copy the upstream signaling into a first signal and a second signal, the first coupler configured to transfer the first signal to the gate;

a first bandpass filter operably connected between the first coupler and the detector, the first bandpass filter filtering the gate-control signal from the second signal to generate a third signal, the third signal excluding any portion of the upstream signaling falling outside a bandwidth allocated to the gate-control signal, the detector detecting for the gate-control signal as a function of the third signal;

a second coupler operably connected between the first bandpass filter and the detector, the second coupler configured to copy the third signal into a fourth signal and a fifth signal, the detector processing the fourth signal to detect the gate-control signal;

a second bandpass filter operably connected between the gate and the first interface, the second bandpass filter filtering the gate-control signal from the first signal passed through the gate to generate a sixth signal, the sixth signal excluding any portion of the upstream signaling falling inside the bandwidth allocated to the gate-control signal; and a third coupler operably connected between the second bandpass filter and the first interface, the third coupler configured for combining the fifth signal with the sixth signal to create a seventh signal, the seventh signal forming the upstream signaling interfaced with the first endpoint.

6. The noise management device of claim 5 wherein the detector is configured to control the gate to the first position when detecting the gate-control signal within the upstream signaling, the communication system including a controller tasked with allocating timeslots to the plurality of devices, the controller being configured to allocate the timeslots so as to prevent the plurality of devices from embedding the gate-control signal within the upstream signaling while the downstream signaling is active, the plurality of devices requiring at least one of the timeslots in order to embed the gate-control signal within the upstream signaling.

7. The noise management device of claim 6 wherein the detector is configured to detect the gate-control signal as a pilot tone embedded within the upstream signaling, the pilot tone being transmitted within the 900-1200 MHz frequency range.

8. The noise management device of claim 5 wherein the detector is configured to control the gate to the first position after expiration of an appropriate period of time following control of the gate to the second position, the detector configured to determine the appropriate period of time as a function of data included within the gate-control signal.

9. A signaling system comprising:

a first endpoint configured to interface upstream and downstream signaling with a network;

a second endpoint configured to interface the upstream and downstream signaling with a plurality of devices, each of the plurality of devices communicating through the second endpoint when transmitting the upstream signaling and when receiving the downstream signaling, each device being configured to embed a gate-control signal within the upstream signaling when desiring upstream communications;

a noise management device configured to ameliorate noise funneling comprising:

i) a first interface operable to exchange signals with the first endpoint;

ii) a second interface operable to exchange signals with the second endpoint;

iii) a first amplifier operable to amplify the downstream signaling while being communicated from the first interface to the second interface;

iv) a second amplifier operable to amplify the upstream signaling while being communicated from the second interface to the first interface;

v) a gate operably connected between the first interface and the second interface and controllable between at least a first position and a second position, the first position disabling the upstream signaling and the second position enabling the upstream signaling; and vi) a detector configured to control the gate to the second position upon detecting the gate-control signal being embedded within the upstream signaling by any one of the plurality of devices;

wherein the second endpoint is configured to include data within a payload of the gate-control signal;

wherein the detector is configured to process the data prior to controlling the gate to the second position, including controlling the gate to the second position if the data matches with a previously assigned identifier and to prevent controlling the gate to the second position if the data fails to match with the previously assigned identifier;

wherein the first position enables downstream signaling and the second position disables downstream signaling;

wherein the detector is configured to control the gate to the first position in the absence of detecting the gate-control signal being embedded within the upstream signaling by any one of the plurality of devices after expiration of an appropriate period of time following control of the gate to the second position;

wherein the gate includes a first connector and a second connector:

i) the first connector operably connects the first interface to the first amplifier when the gate is in the first position and the second connector operably connects the first amplifier to the second interface to enable downstream signaling, thereby disconnecting the second amplifier; and ii) the first connector operably connects the first interface to the second amplifier when the gate is in the second position and the second connector operably connects the second amplifier to the second interface when the gate is in the second position to enable upstream signaling, thereby disconnecting the first amplifier to prevent downstream signaling;

wherein the noise management device includes a first coupler operably connected to the second interface to copy the upstream signaling into a first signal and a second signal, the first coupler configured to transfer the first signal to the second connector and to transfer the second signal for use with the detector, the detector detecting for the gate-control signal based on the second signal;

wherein the first noise management device includes a first bandpass filter operably connected between the first coupler and the detector, the first bandpass filter filtering the gate-control signal from the second signal to generate a third signal, the third signal excluding any portion of the upstream signaling falling outside a bandwidth allocated to the gate-control signal, the detector detecting for the gate-control signal based on the third signal;

wherein the first noise management device includes a third amplifier operably connected between the first bandpass filter and the detector, the third amplifier amplifying the third signal to create a fourth signal, the detector detecting for the gate-control signal based on the fourth signal; and wherein the first noise management device includes:

i) a second coupler operably connected between the third amplifier and the detector, the second coupler configured to copy the fourth signal into a fifth signal and a sixth signal, the detector processing the fifth signal to detect the gate-control signal;

ii) a second bandpass filter operably connected between the first connector and the first interface, the second bandpass filter filtering the gate-control signal from the first signal to generate a seventh signal, the seventh signal excluding any portion of the upstream signaling falling inside the bandwidth allocated to the gate-control signal; and iii) a third coupler operably interconnected between the second bandpass filter and the first interface, the third coupler configured for combining the sixth signal with the seventh signal to create an eighth signal, the eighth signal forming the upstream signaling interfaced with the first endpoint.

* * * * *